United States Patent
Furihata

(10) Patent No.: US 7,530,695 B2
(45) Date of Patent: May 12, 2009

(54) PROJECTOR

(75) Inventor: Takeshi Furihata, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 227 days.

(21) Appl. No.: 11/220,652

(22) Filed: Sep. 8, 2005

(65) Prior Publication Data

US 2006/0055894 A1 Mar. 16, 2006

(30) Foreign Application Priority Data

Sep. 8, 2004 (JP) .............................. 2004-260559
Jul. 25, 2005 (JP) .............................. 2005-213794

(51) Int. Cl.
*G03B 21/20* (2006.01)
*G03B 23/18* (2006.01)
*F21S 8/00* (2006.01)
*F21V 17/02* (2006.01)
*G02B 27/00* (2006.01)

(52) U.S. Cl. .............................. 353/85; 353/93; 353/97; 353/102; 362/268; 362/277; 362/319; 359/578

(58) Field of Classification Search ................. 353/85, 353/37, 86, 88, 90, 91, 93, 97–99, 102; 362/68, 362/282, 321, 322, 324, 277, 319; 359/577, 359/578, 584
See application file for complete search history.

(56) References Cited

U.S. PATENT DOCUMENTS

| 5,519,518 | A | 5/1996 | Watanabe et al. | |
| 5,597,223 | A | 1/1997 | Watanabe et al. | |
| 6,559,901 | B2 * | 5/2003 | Yamamoto et al. | 349/5 |
| 6,719,428 | B2 | 4/2004 | Noguchi | |
| 6,992,718 | B1 | 1/2006 | Takahara | |
| 7,207,679 | B2 * | 4/2007 | Totani et al. | 353/97 |

FOREIGN PATENT DOCUMENTS

| JP | A-8-106090 | 4/1996 |
| JP | A-9-105902 | 4/1997 |
| JP | A-9-189893 | 7/1997 |
| JP | A-2000-194067 | 7/2000 |
| JP | A-2001-100699 | 4/2001 |
| JP | A-2001-142028 | 5/2001 |
| JP | A-2002-300498 | 10/2002 |
| JP | A-2003-131322 | 5/2003 |
| JP | A-2004-69966 | 3/2004 |

* cited by examiner

*Primary Examiner*—Rochelle-Ann J Blackman
(74) *Attorney, Agent, or Firm*—Oliff & Berridge, PLC

(57) ABSTRACT

Aspects of the invention can provide a projector that can include a light source unit, an optical modulation element that modulates light from the light source unit on the basis of image data, a light adjusting unit that adjusts the amount of light incident on the light modulation element from the light source unit, and a control unit that controls the light modulation element and the light adjusting unit. The control unit can perform light adjustment control to adjust the amount of light according to a luminance distribution pattern of image data for the light adjusting unit and can perform correction control to correct display irregularity of image data based on the adjustment of the amount of light for the light modulation element.

18 Claims, 8 Drawing Sheets

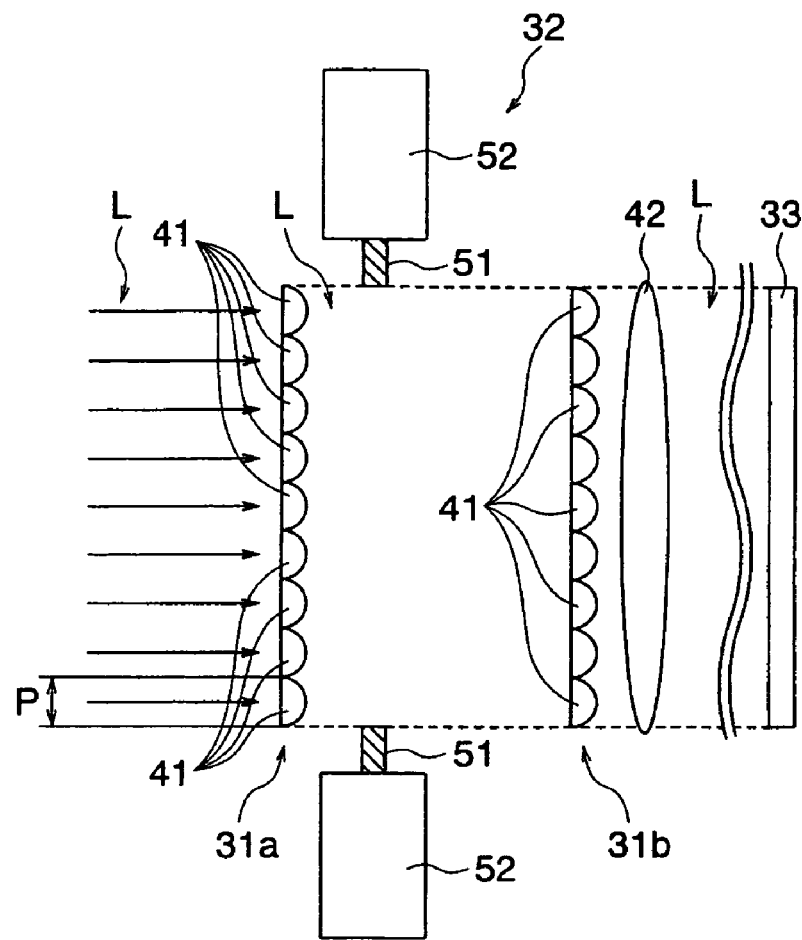

HISTOGRAM OF G3

FIG. 11

| LUMINANCE DISTRIBUTION PATTERN | A1 | A2 | A3 |
|---|---|---|---|
| AMOUNT OF ADJUSTED LIGHT | SMALL | SMALL | SMALL |
| GRAY-SCALE REGION | ALMOST ENTIRE REGION | GRAY-SCALE REGION EXCLUDING LOW REGION | GRAY-SCALE REGION EXCLUDING LOW REGION AND MEDIUM REGION |
| CORRECTION PATTERN | C3 | C3 | C3 |

| LUMINANCE DISTRIBUTION PATTERN | A4 | A5 | A6 |
|---|---|---|---|
| AMOUNT OF ADJUSTED LIGHT | MEDIUM | MEDIUM | MEDIUM |
| GRAY-SCALE REGION | ALMOST ENTIRE REGION | GRAY-SCALE REGION EXCLUDING LOW REGION AND HIGH REGION | GRAY-SCALE REGION EXCLUDING LOW REGION AND SLIGHTLY HIGH REGION |
| CORRECTION PATTERN | C2 | C2 | C2 |

| LUMINANCE DISTRIBUTION PATTERN | A7 | A8 | A9 |
|---|---|---|---|
| AMOUNT OF ADJUSTED LIGHT | LARGE | LARGE | LARGE |
| GRAY-SCALE REGION | GRAY-SCALE REGION EXCLUDING LOW REGION | GRAY-SCALE REGION EXCLUDING LOW REGION AND HIGH REGION | GRAY-SCALE REGION EXCLUDING LOW REGION AND SLIGHTLY HIGH REGION |
| CORRECTION PATTERN | C1 | C1 | C1 |

PROJECTOR

This application claims the benefit of Japanese Patent Applications No. 2004-260559 filed Sep. 8, 2004 and 2005-213794, filed Jul. 25, 2005. The entire disclosure of the prior applications is hereby incorporated by reference herein in its entirety.

BACKGROUND

Aspects of the invention can relate to a projector which has a light modulation element for modulating light from a light source unit and a light adjusting unit for adjusting the amount of light incident on the light modulation element from the light source unit.

In the related art, a projector, which uses a liquid crystal display (LCD) as a light modulation element, has been suggested. In this case, in the LCD, liquid crystal molecules therein are displaced by controlling a voltage applied thereto and the gray-scale level of the LCD changes according to the displacement. Then, projected light is projected on a screen, such that an image is displayed. For example, when an image of a dark color system is displayed, the voltage to be applied is controlled in a low voltage region. In general, however, in such a projector, the displacement of the liquid crystal molecules is difficult to accurately control in the low voltage region, and thus, when an image is displayed in a high dynamic range including a dark color region, the gray-scale level of the LCD is difficult to accurately control.

In order to solve this problem, a projection-type display device disclosed in Japanese Unexamined Patent Application Publication No. 2001-100699 (page 8 and FIG. 10) has been suggested. This related art projection-type display device has an illumination-light modulating unit, such as an iris or the like, that is provided between a light source and an optical modulator, such as a liquid crystal display panel or the like. In this related art projection-type display device, the amount of light incident on the liquid crystal display panel can be adjusted according to luminance of an image to be displayed by controlling the illumination-light modulating unit. For this reason, for example, when the image of the dark color system is displayed, the amount of light incident on the liquid crystal display panel is decreased, such that an image can be displayed in a high dynamic range.

In the projection-type display device according to the related art, there are problems described below. In the projection-type display device, for example, the amount of light incident on the liquid crystal display panel is adjusted by use of the illumination-light modulating unit having the iris. However, when the amount of light is adjusted in such a manner, the amount of light incident on the liquid crystal display panel may be made nonuniform, which causes luminance irregularity (shading) or color irregularity (hereinafter, collectively referred to as 'display irregularity') in the displayed image.

Here, in the projection-type display device according to the related art, a light source driving circuit that directly adjusts luminance of a light source may be provided, instead of the above-described illumination-light modulating unit. However, when luminance of the light source is directly adjusted, the operation of the light source may be made unstable, and the adjustment range of luminance of the light source may narrow. Accordingly, when the image of the dark color system is displayed, the luminance control may be made unstable and brightness may be changed.

SUMMARY

An advantage of the invention is that it can provide a projector which can accurately control a gray-scale level for a light modulation element when an image is displayed and reduce display irregularity of the image.

According to an aspect of the invention, a projector can include a light source unit, an optical modulation element that modulates light from the light source unit on the basis of image data, a light adjusting unit that adjusts the amount of light incident on the light modulation element from the light source unit, and a control unit that controls the light modulation element and the light adjusting unit. The control unit can perform light adjustment control to adjust the amount of light according to a luminance distribution pattern of image data for the light adjusting unit and performs correction control to correct display irregularity of image data based on the adjustment of the amount of light for the light modulation element.

In accordance with the aspect of the invention, the light adjustment control can be executed for the light adjusting unit, and thus a gray-scale level control can be performed in a suitable gray-scale region. Therefore, the gray-scale level control for the light modulation element can be accurately performed. Further, the correction control is performed for the light modulation element, and thus, even when irregularity in the amount of light incident on the light modulation element occurs, the irregularity can be cancelled. Therefore, display irregularity of an image can be reliably reduced.

Further, the projector according to the aspect of the invention may further includes a storage unit that stores the adjusted amounts of light correlated with the luminance distribution patterns of a plurality of image data and correction contents for the correction control correlated with the adjusted amounts of light. The control unit may read the adjusted amount of light correlated with the luminance distribution pattern of image data to be displayed from the storage unit so as to execute the light adjustment control, and may read the correction content correlated with the corresponding adjusted amount of light from the storage unit so as to execute the correction control.

According to this configuration, the adjusted amount of light and the correction content correlated with the luminance distribution pattern of image data to be displayed are read from the storage unit so as to execute the light adjustment control and the correction control. Therefore, the light adjustment control and the correction control can be performed at high speed.

Further, the exemplary projector according to the aspect of the invention may further include a pair of lens arrays that are provided between the light source unit and the light modulation element. The light adjusting unit may have a light-shielding plate and a moving unit that moves the light-shielding plate. The control unit may move the light-shielding plate between the pair of lens arrays with the moving unit and may shield light from the lens arrays so as to execute the light adjustment control. According to this configuration, the light-shielding plate can be moved between the pair of lens arrays so as to shield light, such that the amount of light is adjusted. Therefore, the adjustment of the amount of light can be reliably performed with a simple configuration.

Further, in the projector according to the aspect of the invention, it is preferable that each of the lens arrays have a plurality of optical elements, and the control unit moves the light-shielding plate in terms of a predetermined arrangement pitch of each optical element. In particular, when the plurality of optical elements are periodically disposed at the predetermined arrangement pitch, the control unit may move the light-shielding plate in terms of the arrangement pitch. According to this configuration, the light-shielding plate can be moved in terms of the arrangement pitch of each optical element in each lens array, the degree of irregularity in the amount of incident light caused by the adjustment of the amount of light can be specified in advance according to the moving distance of the light-shielding plate. For this reason, display irregularity of the image can be reliably corrected only by executing the correction control with the correction content patterned in correlating with the moving distance of the light-shielding plate. In addition, the storage capacity of a correction table can be minimized.

Further, in the projector according to the aspect of the invention, it is preferable that the control unit may move the light-shielding plate in terms of a 1/n length (where n is an integer of two or more) of the arrangement pitch of each optical element. According to this configuration, the light-shielding plate is moved in terms of the 1/n length of the arrangement pitch of the optical element, and thus a fine light adjustment control can be performed according to the luminance distribution pattern of the image to be displayed.

Further, the projector according to the aspect of the invention may further include a pair of lens arrays that are provided between the light source unit and the light modulation element. The light adjusting unit may have a liquid crystal element that is provided between the pair of lens arrays. The control unit may control the liquid crystal element and may change transmittance so as to execute the light adjustment control. According to this configuration, the liquid crystal element provided between the pair of lens arrays can be controlled and transmittance is changed, such that the amount of light is adjusted. Therefore, since light is not partially shielded, light can be uniformly incident on the light modulation element, such that display irregularity can be sufficiently controlled.

Further, in the projector according to the aspect of the invention, it is preferable that, when the correction control is performed for the light modulation element, the control unit execute the correction control of display irregularity of image data based on the adjustment of the amount of light by the liquid crystal element for the liquid crystal element.

According to this configuration, when the correction control is performed for the light modulation element, the correction control can be performed for the liquid crystal element. Therefore, even when irregularity in transmittance of the liquid crystal element occurs due to rubbing irregularity at the time of manufacture, the correction control for correcting the gray-scale level so as to allow irregularity in transmittance to be cancelled is performed for the liquid crystal element. Further, when the amount of light incident on the light modulation element is not uniformly controlled only by the correction control, the correction control is performed for the light modulation element. As a result, display irregularity can be substantially completely corrected.

Further, in the projector according to the aspect of the invention, it is preferable that the luminance distribution pattern of image data be defined by a dynamic range of a luminance distribution and average luminance of an image. Therefore, display of a high dynamic range according to characteristics of image data can be realized.

Further, in the projector according to the aspect of the invention, it is preferable that display irregularity of image data based on the adjustment of the amount of light correspond to a spatially nonuniform illumination of the light modulation element due to a spatial arrangement of the light-shielding plate. In this case, the degree of freedom of the shape or arrangement of the light-shielding plate can be increased, and the range of the adjusted amount of light can be relatively increased.

BRIEF DESCRIPTION OF THE DRAWINGS

The invention will be described with reference to the accompanying drawings, wherein like numbers reference like elements, and wherein:

FIG. 3 is a diagram showing the configuration of a light adjusting mechanism 32 in a state in which the amount of light is not adjusted;

FIG. 4 is a diagram showing the relationship among average luminance (APL), dynamic ranges (DR), and luminance distribution patterns A1 to A9;

FIG. 11 is a diagram showing the relationship among the luminance distribution patterns, the adjusted amounts of light, gray-scale regions, and correction patterns;

DETAILED DESCRIPTION OF EMBODIMENTS

Figure 1:
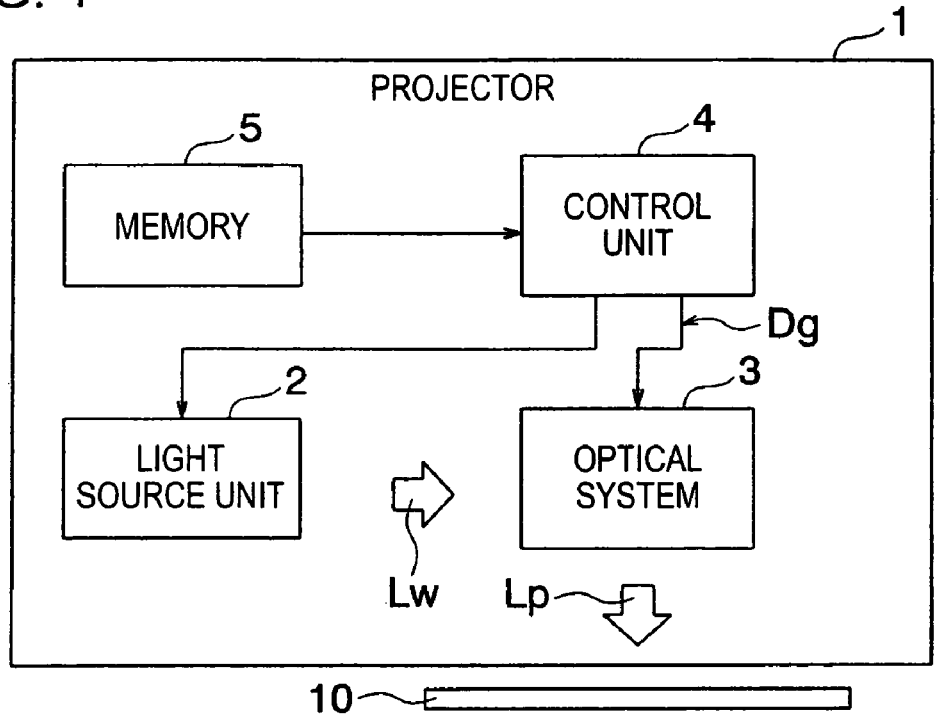
FIG. 1 is an exemplary block diagram showing the configuration of a projector 1.

Hereinafter, preferred embodiments of a projector according to the invention will be described with reference to the accompanying drawings. A projector 1 shown in FIG. 1 is an example of a projector according to the invention. The projector 1 has a light source unit 2, an optical system 3, a control unit 4, and a memory 5. As an example, the light source unit 2 has a high-luminance lamp, such as a metal halide lamp or a high-pressure mercury lamp. The light source unit 2 is turned on under the control of the control unit 4 so as to emit light Lw including a red light component Lr, a green light component Lg, and a blue light component Lb (hereinafter, referred to as light L when the respective light components do not need to be identified).

Figure 2:
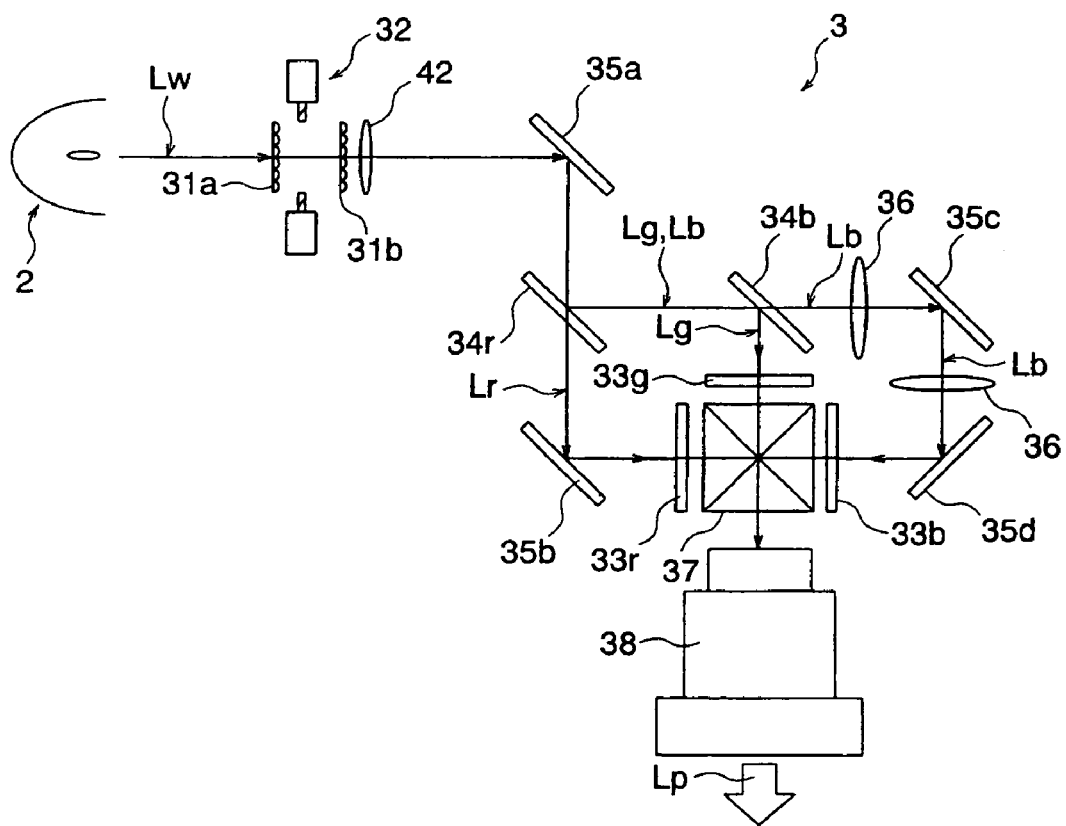
FIG. 2 is a diagram showing the schematic configuration of a light source unit 2 and an optical system 3.

As shown in FIG. 2, the optical system 3 has a pair of lens arrays 31a and 31b, a superimposing lens 42, a light adjusting mechanism 32, liquid crystal light valves 33r, 33g, and 33b (hereinafter, referred to as liquid crystal light valve 33 when the respective liquid crystal light valves do not need to be identified), dichroic mirrors 34r and 34b, reflective mirrors 35a to 35d, relay lenses 36 and 36, a prism 37, and a projection lens 38. The lens array 31a functions as a beam splitting optical element that splits a beam from the light source lamp into a plurality of partial beams. The lens array 31a has a plurality of optical elements 41, 41, . . . that are arranged in a matrix shape at a predetermined pitch in a plane perpendicular to an illumination-light axis (see FIG. 3). The lens array 31b is an optical element that adjusts divergence angles of the plurality of partial beams split by the lens array 31a. Like the lens array 31a, the lens array 31b has a plurality of optical elements 41, 41, . . . that are arranged in a matrix shape in a plane perpendicular to the illumination-light axis. The superimposing lens 42 may be a condenser lens. The superimposing lens 42 collects the plurality of partial beams passing through the pair of lens arrays 31a and 31b and superimposes collected light onto an image formation region of the liquid crystal light valve 33. The light adjusting mechanism 32 is an example of a light adjusting unit of the invention. As shown in FIG. 1, the light adjusting mechanism 32 has light-shielding plates 51 and 51 and moving units 52 and 52. In this case, when the moving units 52 moves the light-shielding plates 51 to be close to each other in terms of the pitch P of the optical elements 41, 41, . . . between both the lens arrays 31a and 31b according to the control of the control unit 4 so as to shield light L, the light adjusting mechanism 32 adjusts the amount of light incident on the liquid crystal light valve 33 (hereinafter, referred to as 'light adjustment').

The liquid crystal light valves 33r, 33g, and 33b can be light modulation elements that modulate the red light component Lr, the green light component Lg, and the blue light component Lb, respectively, on the basis of image data Dg according to the control of the control unit 4. As shown in FIG. 2, the dichroic mirrors 34r and 34b, the reflective mirrors 35a to 35d, and the relay lenses 36 and 36 are provided in a light path of light L and allow light L to be incident to the liquid crystal light valve 33. In this case, the dichroic mirror 34r transmits the red light component Lr and reflects the green light component Lg and the blue light component Lb. Further, the dichroic mirror 34b transmits the blue light component Lb and reflects the green light component Lg. Further, the reflective mirrors 35a to 35d reflect light L (total reflection). Therefore, only the red light component Lr of light Lw is incident on the liquid crystal light valve 33r, only the green light component Lg of light Lw is incident on the liquid crystal light valve 33g, and only the blue light component Lb of light Lw is incident on the liquid crystal light valve 33b. The prism 37 synthesizes the red light component Lr, the green light component Lg, and the blue light component Lb modulated by the liquid crystal light valves 33r, 33g, and 33b. The projection lens 38 projects synthesized light (projection light Lp) by the prism 37 onto a screen 10 on a magnified scale.

The control unit 4 controls turning-on and turning-off the light source unit 2. Further, the control unit 4 controls the liquid crystal light valve 33 of the optical system 3 on the basis of image data Dg from an external device so as to modulate light L from the light source unit 2. In addition, the control unit 4 performs light adjustment control to be described below for the light adjusting mechanism 32 so as to adjust the amount of light L incident on the liquid crystal light valve 33 to the amount of light according to a luminance distribution pattern of an image to be displayed. Further, the control unit 4 performs correction control to be described below for the liquid crystal light valve 33 so as to correct display irregularity of the image based on the adjustment of the amount of light (light adjustment). The memory (a storage unit in the invention) 5 stores a data table in which luminance distribution patterns of images, the adjusted amounts of light L required for accurately displaying the images with the luminance distribution patterns, correction patterns (correction contents in the invention) required for correcting display irregularity of images at the time of executing the light adjustment control with the adjusted amounts of light are correlated with one another. In this case, in the data table, for example, as representative luminance distribution patterns, nine luminance distribution patterns A1 to A9 are defined by three kinds of a dynamic range (hereinafter, referred to as DR) of a luminance distribution, that is, 'wide', 'medium', and 'narrow', and three kinds of average luminance (hereinafter, referred to as APL), that is, 'high', 'medium', and 'low', as shown in FIG. 4. The data table can include the adjusted amounts of light and the correction patterns correlated with the nine luminance distribution patterns.

Next, the relationship between the adjusted amount of light and the correction pattern will be described with reference to the drawings. The liquid crystal light valve 33 does not perform the accurate gray-scale level control due to its characteristics when an image of a dark color system is displayed. For this reason, in order to accurately display an image G1 with luminance to be originally displayed, such as an image G1 shown in FIG. 5A, that is, an image G1 having a low APL and a narrow DR (see a histogram of FIG. 5B) or an image G1, the luminance distribution pattern of which is classified into the luminance distribution pattern A9 shown in FIG. 4, the amount of light L incident on the liquid crystal light valve 33 needs to be reduced by defining the adjusted amount of light (the shielded amount of light L) as large. For this reason, as shown in FIG. 11, data indicating the adjusted amount of light of 'large' is correlated with the luminance distribution pattern A9.

Figure 6:
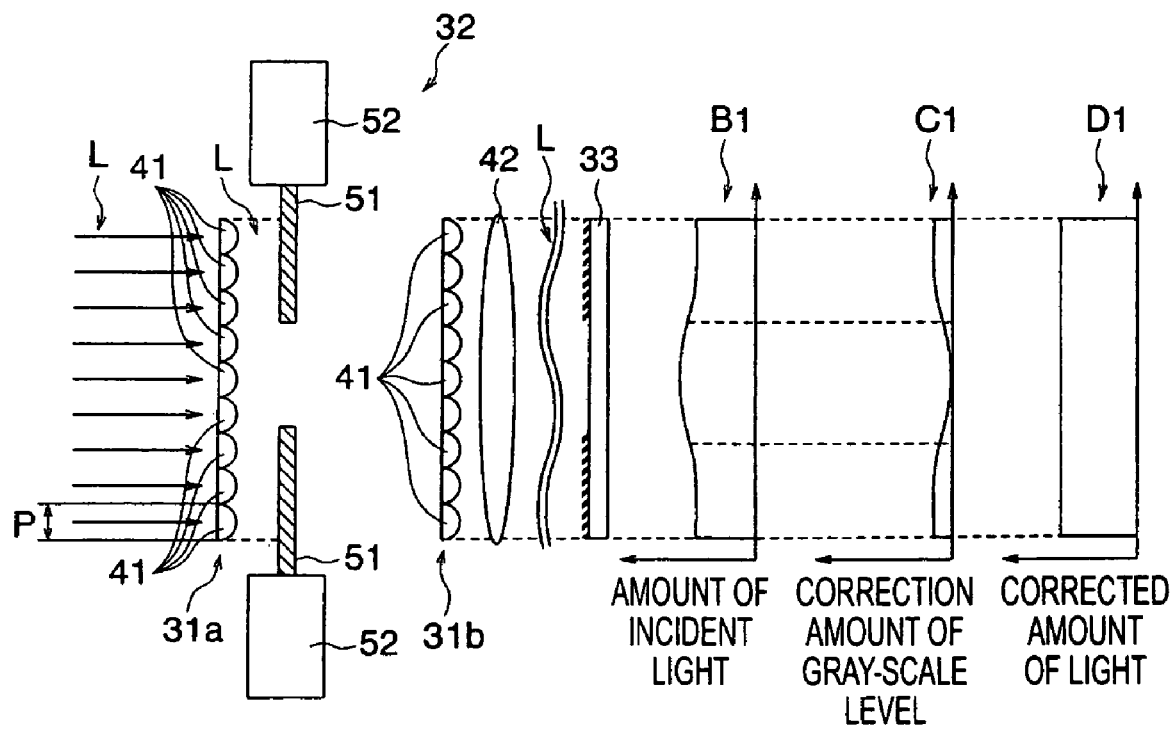
FIG. 6 is a diagram showing the configuration of the light adjusting mechanism 32 when a light-shielding plate 51 is moved by a distance three times as much as a pitch P.

In this case, when the control unit 4 performs the light adjustment control on the basis of data indicating the adjusted amount of light of 'large', for example, as shown in FIG. 6, the light-shielding plates 51 and 51 of the light adjusting mechanism 32 are moved in the light path between the lens arrays 31a and 31b by the distance three times as much as the pitch P of the optical elements 41 in the lens array 31a, such that light L is shielded. In such a manner, light adjustment of the adjusted amount of light of 'large' is performed. As a result, as shown in FIG. 11, the gray-scale level control is performed on the liquid crystal light valve 33 in a range of a gray-scale region, excluding a low region and a slightly high region. Therefore, the accurate modulation control of light L can be achieved, and thus the image G1 can be accurately displayed with luminance to be originally displayed.

Figure 7A:
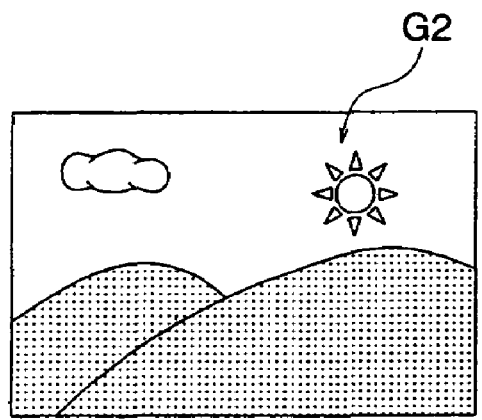
FIG. 7A is a diagram showing a display screen of an image G2.
Figure 7B:
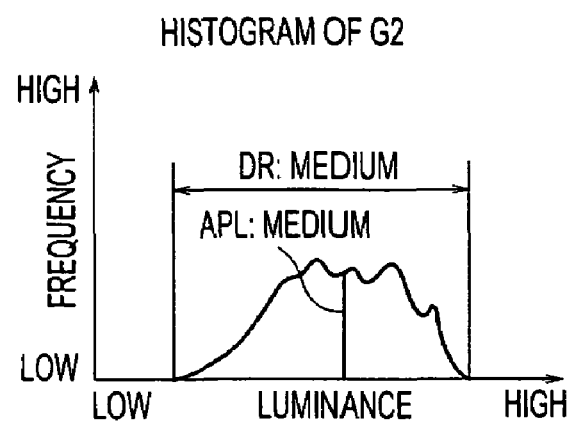
FIG. 7B is a histogram of a luminance distribution of the image G2.

Further, when an image G2, such as an image G2 shown in FIG. 7A, that is, an image G2 having medium APL and DR (see a histogram of FIG. 7B) or an image G2, the luminance distribution pattern of which is classified into the luminance distribution pattern A5 shown in FIG. 4, is displayed, the amount of light L incident on the liquid crystal light valve 33 can be set to be medium by defining the adjusted amount of light as medium, since a dark region in the image G2 is small. For this reason, as shown in FIG. 11, data indicating the adjusted amount of light of 'medium' is correlated with the luminance distribution pattern A5.

Figure 8:
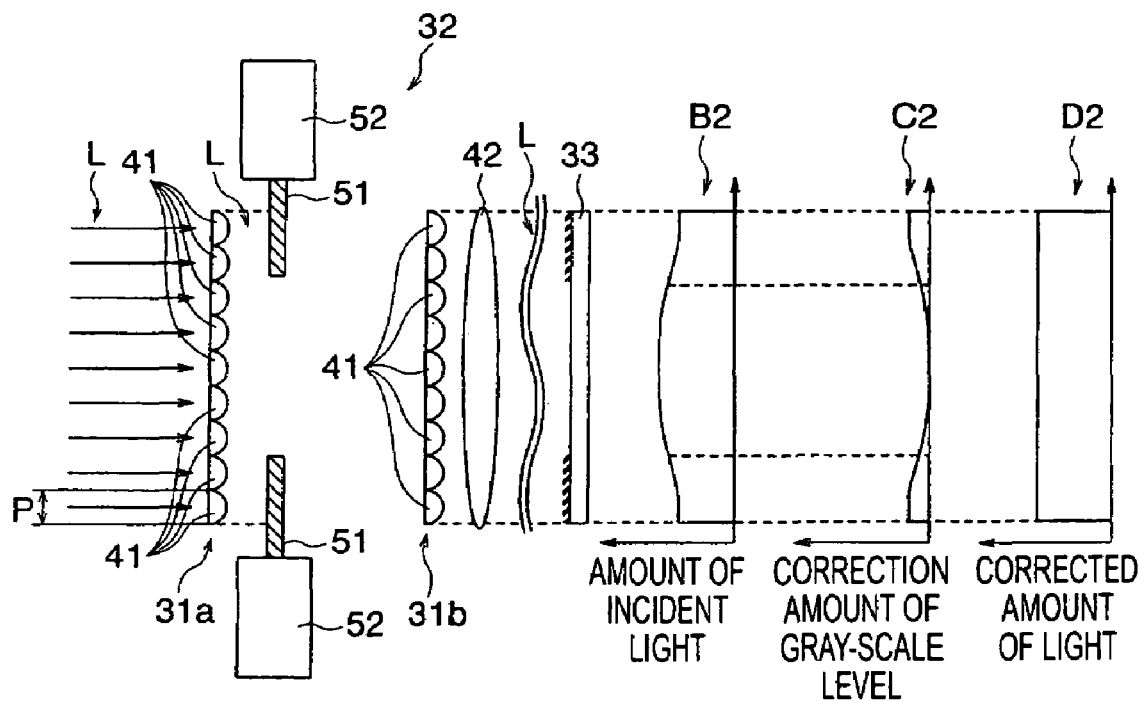
FIG. 8 is a diagram showing the configuration of the light adjusting mechanism 32 when the light-shielding plate 51 is moved by a distance two times as much as the pitch P.

In this case, when the control unit 4 performs the light adjustment control on the basis of data indicating the adjusted amount of light of 'medium', for example, as shown in FIG. 8, the light-shielding plates 51 and 51 of the light adjusting mechanism 32 can be moved in the light path between the lens arrays 31a and 31b by the distance two times as much as the pitch P of the optical elements 41 in the lens array 31a, such that light L is shielded. In such a manner, the light adjustment of the adjusted amount of light of 'medium' is performed. As a result, as shown in FIG. 11, the gray-scale level control is performed on the liquid crystal light valve 33 in a range of a gray-scale region, excluding a low region and a high region. Therefore, the relatively accurate modulation control of light L can be achieved, and thus the image G2 can be accurately displayed with luminance to be originally displayed.

Figure 9A:
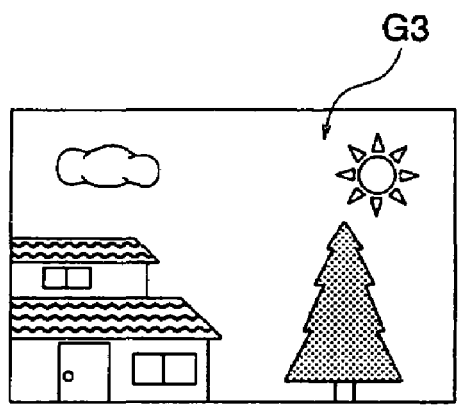
FIG. 9A is a diagram showing a display screen of an image G3.
Figure 9B:
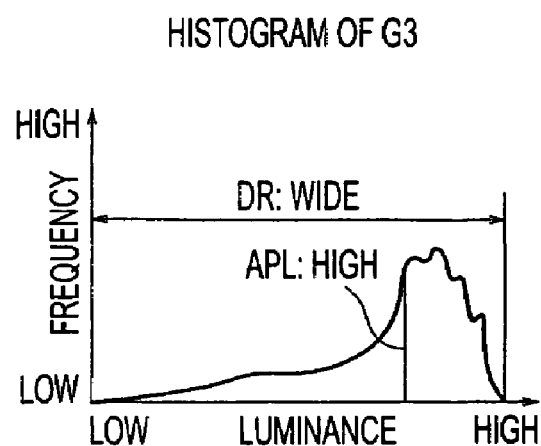
FIG. 9B is a histogram of a luminance distribution of the image G3.

Further, when an image G3 (hereinafter, referred to as 'image G' when it does not need to be identified from the above-described images G1 and G2), such as an image G3 shown in FIG. 9A, that is, an image G3 having a high APL and a wide DR (see a histogram of FIG. 9B) or an image G3, the luminance distribution pattern of which is classified into the luminance distribution pattern A1 shown in FIG. 4, is displayed, the adjusted amount of light is defined as small, since a bright region in the image G3 is difficult to display if the amount of light L incident on the liquid crystal light valve 33 is excessively low. For this reason, as shown in FIG. 11, data indicating the adjusted amount of light of 'small' is correlated with the luminance distribution pattern A1.

Figure 10:
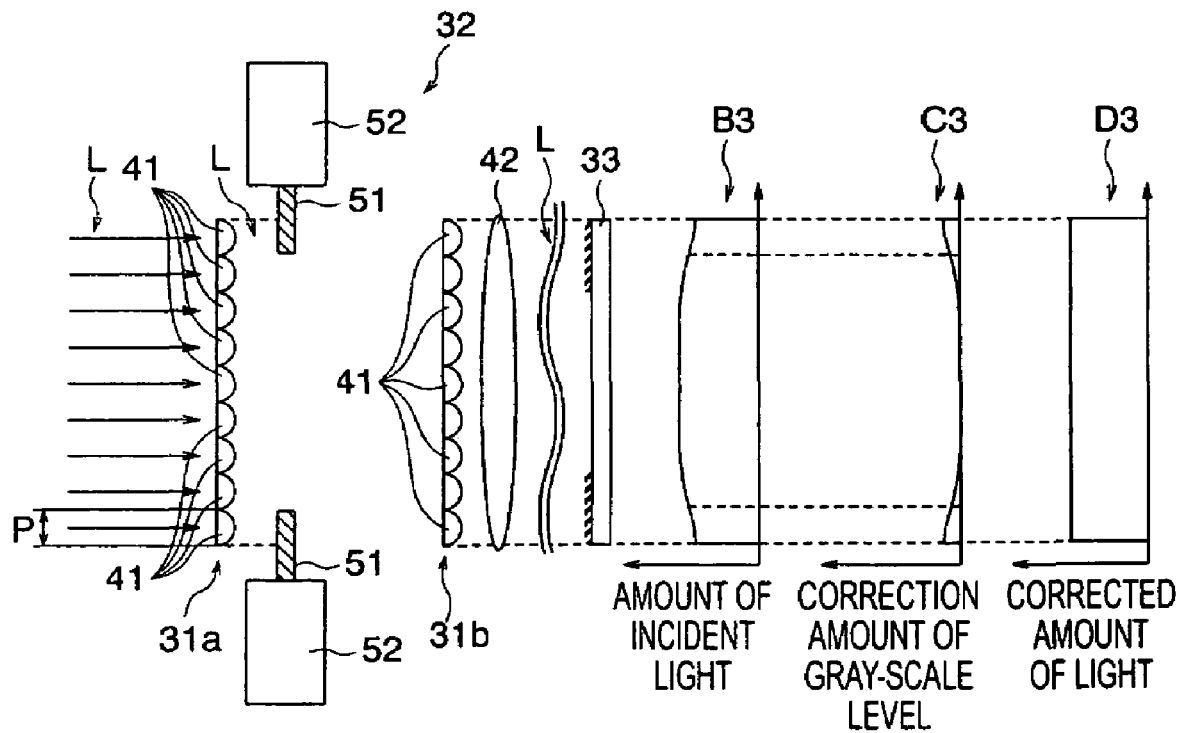
FIG. 10 is a diagram showing the configuration of the light adjusting mechanism 32 when the light-shielding plate 51 is moved by the pitch P.

In this case, when the control unit 4 performs the light adjustment control on the basis of data indicating the adjusted amount of light of 'small', for example, as shown in FIG. 10, the light-shielding plates 51 and 51 of the light adjusting mechanism 32 can be moved in the light path between the lens arrays 31a and 31b by the pitch P of the optical elements 41 in the lens array 31a, such that light L is shielded. In such a manner, the light adjustment of the adjusted amount of light of 'small' is performed. As a result, as shown in FIG. 11, the gray-scale level control is performed on the liquid crystal light valve 33 in almost the entire gray-scale region. Therefore, the accurate modulation control of light L can be achieved, and thus the image G3 can be accurately displayed with luminance to be originally displayed.

On the other hand, when the light adjustment is performed by use of the light-shielding plates 51 and 51, as shown in a distribution pattern B1 of the amount of incident light of FIG. 6, irregularity in the amount of light L incident on the liquid crystal light valve 33 occurs, which causes display irregularity in an image G. Such display irregularity occurs corresponding to a spatial arrangement of the light-shielding plates 51 and 51. When the shape of an opening of illumination light defined by the light-shielding plates 51 and 51 changes, a spatial luminance distribution pattern changes, and thus the liquid crystal light valve 33 is illuminated nonuniformly. For this reason, for example, in order to correct display irregularity of the image G, the correction control is performed by increasing the gray-scale level of a region, in which the amount of incident light is small, in the liquid crystal light valve 33 such that the difference in the amount of incident light is cancelled. Moreover, FIGS. 6, 8, and 10 schematically show a panel surface in the liquid crystal light valve 33 (see FIG. 6) along a vertical axis and schematically show the amount of light L incident on the liquid crystal light valve 33 along a horizontal axis, with respect to the distribution pattern B1 of the amount of incident light and distribution patterns B2 and B3 of the amount of incident light to be described below.

In this case, when the light adjustment control is performed on the basis of data indicating the adjusted amount of light of 'large' correlated with the above-described luminance distribution pattern A9, as shown in the distribution pattern B1 of the amount of incident light of FIG. 6, the amount of incident light is lowered in a relatively wide range at an outer circumference of the liquid crystal light valve 33. For this reason, as shown in FIGS. 6 and 11, a correction pattern C1 for increasing the gray-scale level in a relatively wide range of the outer circumference of the liquid crystal light valve 33 is correlated with the luminance distribution pattern A9. Moreover, FIGS. 6, 8, 10, and 11 schematically show a panel surface in the liquid crystal light valve 33 (see FIG. 6) along the vertical axis and schematically show the correction amount of gray-scale level in the correction control along the horizontal axis, with respect to the correction pattern C1 and correction patterns C2 and C3 to be described below.

Further, when the light adjustment control is performed on the basis of data indicating the adjusted amount of light of 'medium' correlated with the above-described luminance distribution pattern A5, as shown in the distribution pattern B2 of the amount of incident light of FIG. 8, the amount of incident light is lowered in a medium wide range at the outer circumference of the liquid crystal light valve 33. For this reason, as shown in FIGS. 8 and 11, the correction pattern C2 for increasing the gray-scale level in a medium wide range of the outer circumference of the liquid crystal light valve 33 is correlated with the luminance distribution pattern A5. Further, when the light adjustment control is performed on the basis of data indicating the adjusted amount of light of 'small' correlated with the above-described luminance distribution pattern A1, as shown in the distribution pattern B3 of the amount of incident light of FIG. 10, the amount of incident light is lowered in a relatively narrow range at the outer circumference of the liquid crystal light valve 33. For this reason, as shown in FIGS. 10 and 11, the correction pattern C3 for increasing the gray-scale level in a relatively narrow range of the outer circumference of the liquid crystal light valve 33 is correlated with the luminance distribution pattern A1. Moreover, as shown in FIG. 11, with respect to the luminance distribution patterns A2 to A4 and A6 to A8, similarly, the adjusted amounts of light and the correction patterns most suitable for the respective luminance distribution patterns are correlated in order to accurately display the images with luminance to be originally displayed.

Figure 5A:
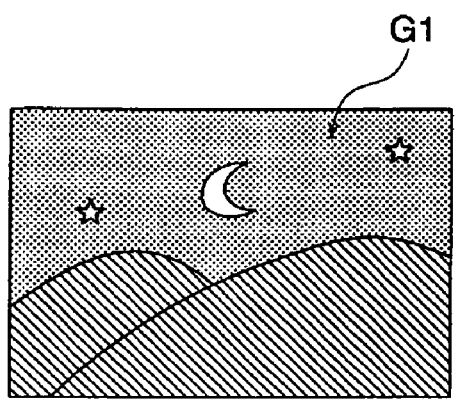
FIG. 5A is a diagram showing a display screen of an image G1.
Figure 5B:
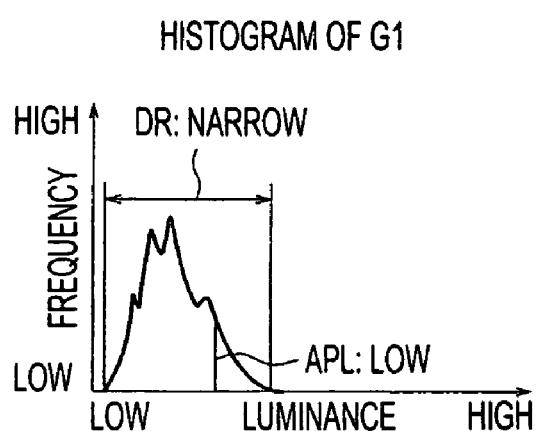
FIG. 5B is a histogram of a luminance distribution of the image G1.
Figure 12:
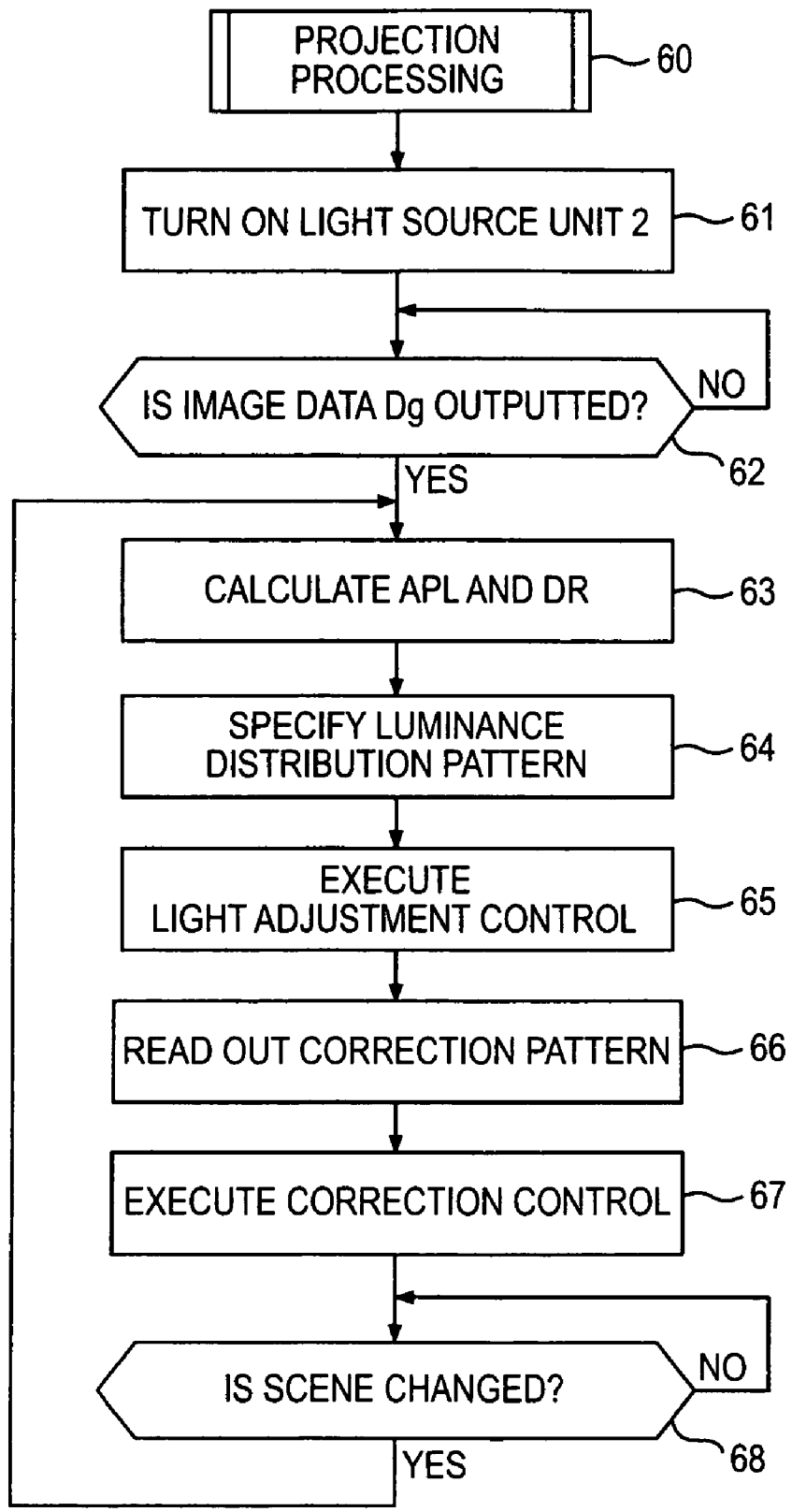
FIG. 12 is a flowchart of an exemplary projection processing 60.

Next, an example of the operation of the projector 1 will be described with reference to the drawings. In this projector 1, when power is turned on, the control unit 4 performs projection processing 60 shown in FIG. 12. In this projection processing 60, the control unit 4 turns on the light source unit 2 (Step 61) and then judges whether or not image data Dg is outputted from an external device, such as a television tuner, a DVD player, or the like (Step 62). If it is judged that image data Dg is outputted, the control unit 4 calculates APL and DR of an image to be displayed (for example, the image G1 shown in FIG. 5A) on the basis of image data Dg (Step 63). Next, the control unit 4 searches the data table stored in the memory 5 and specifies the luminance distribution pattern closest to the calculated APL and DR (Step 64). In this case, as shown in FIG. 5A, since APL of the image G1 is low and DR thereof is narrow, the control unit 4 specifies the luminance distribution pattern A9 shown in FIG. 4 as the closest luminance distribution pattern.

Subsequently, the control unit 4 reads data indicating the adjusted amount of light of 'large' correlated with the specified luminance distribution pattern A9 from the data table and performs the light adjustment control for the light adjusting mechanism 32 (Step 65). In this case, the control unit 4 controls the light adjusting mechanism 32 on the basis of data of the adjusted amount of light read and moves the light-shielding plates 51 and 51 in the light path between the lens arrays 31a and 31b by the distance three times as much as the pitch of the optical elements 41, as shown in FIG. 6. Accordingly, a portion of light L is shielded and the amount of light L incident on the liquid crystal light valve 33 is adjusted (that is, decreased by a large amount corresponding to the adjusted amount of light of 'large').

Next, the control unit 4 reads data for the correction pattern C1 correlated with the luminance distribution pattern A9 from the data table (Step 66). Next, the control unit 4 controls the liquid crystal light valve 33 on the basis of image data Dg so as to modulate light L. At this time, the control unit 4 performs the correction control for the liquid crystal light valve 33 on the basis of data for the correction pattern C1 read in order to increase the gray-scale level, the amount of incident light of which is in a low range (Step 67). Accordingly, the liquid crystal light valve 33 modulates light L, and thus projection light Lp is projected onto the screen 10. In this case, the control unit 4 performs the correction control, and thus, as shown in a corrected distribution pattern D1 of the amount of light of FIG. 6, irregularity in the amount of incident light L on the liquid crystal light valve 33 is almost entirely cancelled. As a result, display irregularity due to irregularity in the amount of incident light is reduced, and the image G1 is accurately displayed with luminance to be displayed.

Subsequently, the control unit 4 judges, on the basis of image data Dg, whether or not a scene (image) changes (Step 68). At this time, when the scene does not change, the control unit 4 executes the step 68 repeatedly. On the other hand, when the scene changes, the control unit 4 executes the steps 63 and 64 and specifies the luminance distribution pattern closest to APL and DR of an image (for example, the image G2 shown in FIG. 7A) of a next scene.

In this case, as shown in FIG. 7A, since both APL and DR of the image G2 are medium, the control unit 4 specifies the luminance distribution pattern A5 shown in FIG. 4 as the closest luminance distribution pattern. Next, the control unit 4 reads data indicating the adjusted amount of light of 'medium' correlated with the luminance distribution pattern A5 from the data table in the memory 5, performs the light adjustment control for the light adjusting mechanism 32, and moves the light-shielding plates 51 and 51 in the light path between the lens arrays 31a and 31b by the distance two times as much as the pitch of the optical elements 41, as shown in FIG. 8 (Step 65). Next, the control unit 4 reads data for the correction pattern C2 correlated with the luminance distribution pattern A5 (Step 66) and controls the liquid crystal light valve 33 on the basis of image data Dg so as to modulate light L. At this time, the control unit 4 performs the correction control for the liquid crystal light valve 33 on the basis of data for the correction pattern C2 read from the data table (Step 67). Accordingly, the liquid crystal light valve 33 modulates light L and thus projection light Lp is projected onto the screen 10. In this case, the control unit 4 performs the correction control, and thus, as shown in a corrected distribution pattern D2 of the amount of light of FIG. 8, irregularity in the amount of incident light L on the liquid crystal light valve 33 is almost entirely cancelled. As a result, the image G2 can be accurately displayed with luminance to be displayed.

Next, the control unit 4 executes the step 68. At this time, when the scene is changed, the control unit 4 executes the steps 63 and 64 and specifies the luminance distribution pattern closest to APL and DR of an image (for example, the image G3 shown in FIG. 9A) of a next scene. In this case, as shown in FIG. 9A, since APL of the image G3 is high and DR thereof is wide, the control unit 4 specifies the luminance distribution pattern A1 shown in FIG. 4 as the closest luminance distribution pattern A1. Next, the control unit 4 reads data indicating the adjusted amount of light of 'small' correlated with the luminance distribution pattern A1 from the data table in the memory 5, performs the light adjustment control for the light adjusting mechanism 32, and moves the light-shielding plates 51 and 51 in the light path between the lens arrays 31a and 31b by the distance as much as the pitch of the optical elements 41 (Step 65).

Subsequently, the control unit 4 reads data for the correction pattern C3 correlated with the luminance distribution pattern A1 (Step 66) and then controls the liquid crystal light valve 33 on the basis of image data Dg so as to modulate light L. At this time, the control unit 4 performs the correction control for the liquid crystal light valve 33 on the basis of data for the correction pattern C3 read from the data table (Step 67). Accordingly, the liquid crystal light valve 33 modulates light L and thus projection light Lp is projected onto the screen 10.

In this case, the control unit 4 performs the correction control and thus, as shown in a corrected distribution pattern D3 of the amount of light of FIG. 10, irregularity in the amount of incident light L on the liquid crystal light valve 33 is almost entirely cancelled. As a result, the image G3 is accurately displayed with luminance to be displayed. Next, the control unit 4 executes the steps 68 and 63 to 67 repeatedly and performs the light adjustment control and the correction control whenever the scene is changed. Moreover, when the adjusted amount of light is instantaneously switched (in a short time), the light adjustment state is abruptly changed, and thus a user may notice a flicker (abrupt flickering of change in luminance). For this reason, when the change of the scene is detected and the adjusted amount of light obtained from APL and DR of the next scene is reflected, it is preferable that the adjusted amount of light be gradually changed over a constant amount of time.

As such, according to the projector 1, the light adjustment control is performed for the light adjusting mechanism 32. Therefore, the gray-scale level control in a proper gray-scale region can be achieved, and thus the gray-scale level control for the liquid crystal light valve 33 can be accurately performed. Further, since the correction control is performed for the liquid crystal light valve 33, even when irregularity in the amount of light L incident on the liquid crystal light valve 33 occurs, irregularity can be cancelled, such that display irregularity of the image G can be reliably reduced.

Further, the light adjustment control and the correction control are performed by reading the adjusted amount of light and the correction pattern correlated with the luminance distribution pattern of the image G to be displayed from the data table. Therefore, the light adjustment control and the correction control can be performed at high speed, as compared with a method in which the adjusted amount of light and the correction pattern are calculated whenever the image G (scene) is changed, for example.

In addition, the light-shielding plates 51 can be moved between the lens arrays 31a and 31b in order to adjust the amount of light L, and thus the adjustment of the amount of light can be reliably performed with the simple configuration.

Further, since the control unit 4 moves the light-shielding plates 51 in terms of the pitch P of the optical elements 41, the degree of irregularity in the amount of incident light L caused by the light adjustment can be specified in advance according to the moving distance of the light-shielding plates 51. For this reason, only by executing the correction control with the correction pattern correlated with the moving direction of the light-shielding plates 51, display irregularity of the image G can be corrected reliably and simply. According to this configuration, correction conditions can be limited in advance, and also the memory 5 for the data table can be minimized, such that the projector 1 can be constituted at low cost accordingly.

Figure 13:
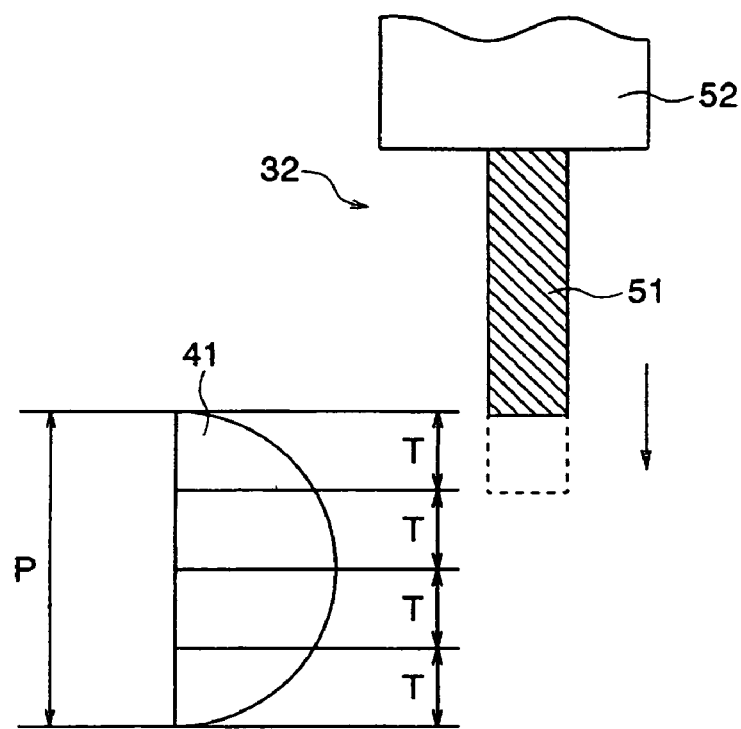
FIG. 13 is a diagram showing the configuration of the light adjusting mechanism 32 when the light-shielding plate 51 is moved in terms of a length T.

Moreover, it should be understood that the invention is not limited to the above-described configuration. The example has been described in which the data table including the adjusted amounts of light and the correction patterns correlated with the nine luminance distribution patterns A1 to A9 is used, but the configuration of the data table is not limited to this configuration and may be changed arbitrarily. In this case, the kinds of the luminance distribution patterns may be defined larger than nine and the data table including the adjusted amounts of light and the correction patterns correlated with the respective luminance distribution patterns may be used. In such a manner, fine light adjustment control and correction control can be performed. Further, the example has been described in which, at the time of the light adjustment control, the light-shielding plates 51 are moved in terms of the pitch P of the optical elements 41, but, as shown in FIG. 13, the configuration may be used in which the light-shielding plates 51 are moved in terms of the 1/n length T (where n is an integer of two or more and, for example, four) (divided length) of the pitch P of the optical elements 41. According to this configuration, a fine light adjustment control can be performed according to the luminance distribution pattern of the image to be displayed. Further, the control unit 4 may use the configuration in which the adjusted amount of light and the correction pattern are calculated according to the luminance distribution pattern of the image, instead of using the data table.

Figure 14:
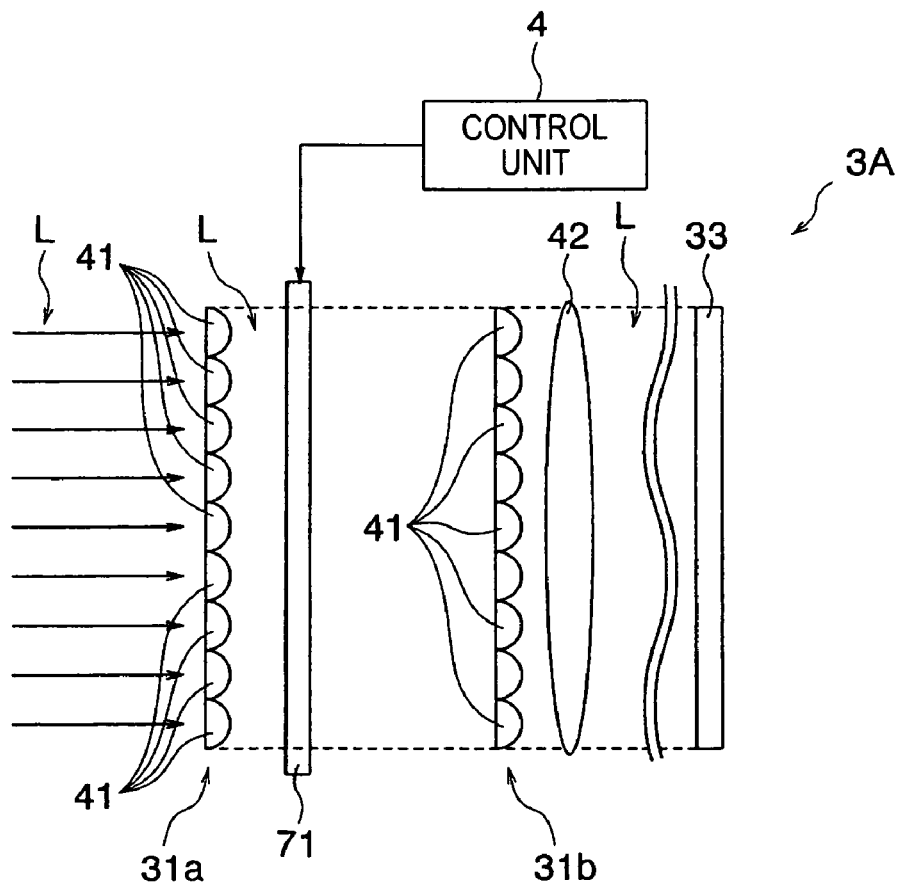
FIG. 14 is a diagram showing the configuration of an optical system 3A.

Further, the optical system 3, which includes a mechanical light adjusting mechanism 32 having the light-shielding plates 51 and the moving units 52, has been described as an example, but, as shown in FIG. 14, an optical system 3A, which includes a liquid crystal element 71 between the pair of lens arrays 31*a* and 31*b*, instead of the light adjusting mechanism 32, is used. The optical system 3A optically performs the adjustment of light L in multi stages or no stage. In this configuration, the control unit 4 controls the liquid crystal element 71 and changes transmittance so as to adjust the amount of light L from the lens array 31*a*, such that the light adjustment (decrease in light) is performed.

In this case, since light L from the lens array 31*a* is not partially shielded, light L can be incident on the liquid crystal light valve 33 relatively uniformly. As a result, display irregularity can be sufficiently suppressed. Further, in this configuration, for example, even when irregularity in transmittance or the light occurs in the liquid crystal element 71 due to rubbing irregularity at the time of manufacture, display irregularity can be reliably reduced by performing the correction control for correcting display irregularity due to irregularity in transmittance for the liquid crystal light valve 33. Further, in this configuration, a method may be used in which the correction control is performed for both the liquid crystal light valve 33 and the liquid crystal element 71. Specifically, at the time of the above-described projection processing 60, the control unit 4 performs the correction control (the correction control to be performed for the liquid crystal element in the invention) for correcting the gray-scale level for the liquid crystal element 71, such that irregularity in transmittance is cancelled according to irregularity in transmittance of the liquid crystal element 71, and at the same time, when the amount of light L incident on the liquid crystal light valve 33 is not controlled only with this correction control for the liquid crystal element 71, performs the correction control for the liquid crystal light valve 33. In such a manner, display irregularity can be substantially completely corrected.

Moreover, light L from the lens array 31*a* may be partially shielded by the liquid crystal element 71. In this case, the shield of light L, the control of the optical system 3, and the like are performed in the same manner as the exemplary embodiments described in FIGS. 2, 6, 8, 10, and the like.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector, comprising:
a light source unit;
a light modulation element that modulates light from the light source unit on a basis of image data, an image produced by the image data being displayed in a plurality of regions;
a light adjusting unit that adjusts an amount of light incident on the light modulation element from the light source unit;
a control unit that controls the light modulation element and the light adjusting unit, the control unit calculating a range of luminance distribution and average luminance of the image data, the range of the luminance distribution including brightness data for each of the plurality of regions, adjusting the amount of light for the light adjusting unit according to the range of the luminance distribution and the average luminance of the image data and selectively controlling the light modulation element to correct display irregularity of the image data caused by an adjustment of the amount of light for the light modulation element for each of the plurality of regions according to the range of the luminance distribution and the average luminance of the image data; and
a pair of lens arrays that are disposed between the light source unit and the light modulation element,
the light adjusting unit having a light-shielding plate and a moving unit that moves the light-shielding plate.

2. The projector according to claim 1, further comprising:
a storage unit that stores the adjusted amounts of light correlated with the range of the luminance distribution and the average luminance of a plurality of image data and correction contents for correcting the display irregularity of image data correlated with the adjusted amounts of light; and
the control unit reading the adjusted amount of light correlated with the range of the luminance distribution and the average luminance of image data to be displayed from the storage unit so as to adjust the amount of light, and reading the correction content correlated with the corresponding adjusted amount of light from the storage unit so as to correct the display irregularity of the image data.

3. The projector according to claim 1,
the control unit moving the light-shielding plate between the pair of lens arrays with the moving unit and shielding light from the lens arrays so as to execute the light adjustment control.

4. The projector according to claim 1,
each of the lens arrays having a plurality of optical elements; and
the control unit moving the light-shielding plate by the unit of each optical element.

5. The projector according to claim 4,
the plurality of optical elements being periodically disposed at a predetermined arrangement pitch; and
the control unit moving the light-shielding plate in terms of the predetermined arrangement pitch of each optical element.

6. The projector according to claim 1,
the control unit moving the light-shielding plate in terms of a 1/n length where n is an integer of two or more of an arrangement pitch of each optical element.

7. The projector according to claim 1,
the light adjusting unit having a liquid crystal element that is provided between the pair of lens arrays.

8. The projector according to claim 7,
the control unit controlling the liquid crystal element and changing transmittance so as to execute the light adjustment control.

9. The projector according to claim 8,
when the correction control is performed for the light modulation element, the control unit performing the correction control of display irregularity of image data based on the adjustment of the amount of light by the liquid crystal element for the liquid crystal element.

10. A control method of a projector, the projector having a light source unit, a light modulation element that modulates light from the light source unit on a basis of image data, and a light adjusting unit that adjusts an amount of light incident on the light modulation element from the light source unit, the method comprising:
calculating a range of luminance distribution and an average luminance of the image data, an image produced by the image data being displayed in a plurality of regions;
adjusting the amount of light for the light adjusting unit according to the range of the luminance distribution and the average luminance of the image data, the range of the luminance distribution including brightness data for each of the plurality of regions; and
selectively controlling the light modulation element to correct display irregularity of the image data caused by the adjusting of the amount of light for the light modulation element for each of the plurality of regions according to the range of the luminance distribution and the average luminance of the image data; and
disposing a pair of lens arrays between a light source unit and the light modulation element, the light adjusting unit including a light shielding plate,
a moving unit that moves the light-shielding plate.

11. The control method according to claim 10, further comprising:
storing the adjusted amounts of light correlated with the range of the luminance distribution and average luminance of a plurality of the image data and correction contents for correcting the display irregularity of the image data correlated with the adjusted amounts of light in a storage unit;
reading the adjusted amount of light correlated with the range of the luminance distribution and average luminance of image data to be displayed from the storage unit so as to adjust the amount of light; and
reading the correction content correlated with the corresponding adjusted amount of light from the storage unit so as to correct the display irregularity of the image data.

12. The control method according to claim 10, further comprising:
moving the light-shielding plate between the pair of lens arrays with the moving unit to shield light from the lens arrays so as to execute the light adjustment control.

13. The control method according to claim 10, further comprising:
disposing a plurality of optical elements in each of the lens arrays; and
moving the light-shielding plate by the unit of each optical element.

14. The control method according to claim 13, further comprising:
disposing the optical elements at a predetermined arrangement pitch,
the moving including moving the light-shielding plate in terms of the predetermined arrangement pitch of each optical element.

15. The control method according to claim 10,
the moving including moving the light-shielding plate in terms of a 1/n length where n is an integer of two or more of an arrangement pitch of each optical element.

16. The control method according to claim 10,
disposing a liquid crystal element between the pair of lens arrays.

17. The control method according to claim 16, further comprising:
controlling the liquid crystal element; and
changing transmittance so as to execute the light adjustment control.

18. The control method according to claim 17,
the correcting the display irregularity of the image data being based on the adjustment of the amount of light by the liquid crystal element for the liquid crystal element when the correction control is performed for the light modulation element.

* * * * *